United States Patent [19]
Dahl et al.

[11] Patent Number: 5,951,741
[45] Date of Patent: Sep. 14, 1999

[54] HYDROCARBON VAPOR RECOVERY PROCESSES AND APPARATUS

[75] Inventors: Randall F. Dahl; Scott J. Fox, both of Tulsa; Devin E. Greenfield, Yale; Thomas M. Steiner, Tulsa, all of Okla.

[73] Assignee: John Zink Company, Tulsa, Okla.

[21] Appl. No.: 09/049,273

[22] Filed: Mar. 27, 1998

[51] Int. Cl.⁶ .................................................. B01D 53/047
[52] U.S. Cl. .................................. 95/11; 95/97; 95/104; 95/146; 96/111; 96/128; 96/130; 96/144; 96/337; 96/345
[58] Field of Search .......................... 95/8, 11, 97, 104, 95/146; 96/111, 122, 126–128, 130, 144, 337, 342–345, 364

[56] References Cited

U.S. PATENT DOCUMENTS

| | | | |
|---|---|---|---|
| 2,211,162 | 8/1940 | Ray et al. ................................. | 95/11 |
| 4,021,211 | 5/1977 | Turek et al. ............................. | 95/11 |
| 4,047,904 | 9/1977 | Worrall .................................... | 95/11 |
| 4,056,369 | 11/1977 | Quackenbush ......................... | 95/11 |
| 4,261,716 | 4/1981 | Schwartz et al. ..................... | 55/387 |
| 4,276,058 | 6/1981 | Dinsmore et al. ..................... | 55/48 |
| 4,331,456 | 5/1982 | Schwartz et al. ..................... | 55/26 |
| 4,414,003 | 11/1983 | Blaudszun ............................. | 95/8 |
| 4,693,730 | 9/1987 | Miller et al. ............................ | 95/8 |
| 4,986,836 | 1/1991 | Tandon .................................. | 96/111 |
| 5,154,735 | 10/1992 | Dinsmore ............................... | 55/25 |
| 5,345,771 | 9/1994 | Dinsmore ............................... | 95/97 X |
| 5,389,125 | 2/1995 | Thayer et al. ......................... | 95/11 |
| 5,480,475 | 1/1996 | Tuttle ..................................... | 96/122 |
| 5,591,254 | 1/1997 | Gibson .................................. | 96/113 |
| 5,755,854 | 5/1998 | Nanaji .................................... | 95/11 |
| 5,853,455 | 12/1998 | Gibson .................................. | 95/11 |

FOREIGN PATENT DOCUMENTS

| | | | |
|---|---|---|---|
| 0239947 | 10/1986 | Germany .............................. | 95/11 |
| 62-017008 | 1/1987 | Japan .................................... | 95/11 |

*Primary Examiner*—Robert Spitzer
*Attorney, Agent, or Firm*—C. Clark Dougherty, Jr.

[57] ABSTRACT

An improved process and apparatus are provided for recovering hydrocarbons from an intermittent or continuous inlet air-hydrocarbon vapor mixture. The air-hydrocarbon vapor mixture is caused to flow through a bed of solid adsorbent whereby hydrocarbons are removed therefrom and a residue gas stream of substantially hydrocarbon-free air is produced. The substantially hydrocarbon-free air is vented into the atmosphere and a second bed of solid adsorbent having hydrocarbons previously adsorbed thereon is regenerated by evacuation. As long as the concentration of hydrocarbons contained in the vented air is below a predetermined concentration, the inlet air-hydrocarbon vapor mixture is caused to continue to flow through the first bed of adsorbent. After the second bed of adsorbent is regenerated, the pumping and evacuation of the second bed is shut down and not restarted so long as the monitored concentration of hydrocarbons is below the predetermined concentration.

20 Claims, 3 Drawing Sheets

HYDROCARBON VAPOR RECOVERY PROCESSES AND APPARATUS

BACKGROUND OF THE INVENTION

1. Field of the Invention

The present invention relates to improved processes and apparatus for recovering hydrocarbons from air-hydrocarbon vapor mixtures.

2. Description of the Prior Art

In handling multi-component and single component hydrocarbon liquids such as gasoline, distillates, benzene and the like, air-hydrocarbon vapor mixtures are produced which cannot be vented directly to the atmosphere due to the resulting pollution of the environment and fire and/or explosion hazard. As a result, various processes and apparatus have been developed and used for removing hydrocarbon vapors from air-hydrocarbon vapor mixtures whereby the remaining substantially hydrocarbon-free air can be safely vented to the atmosphere. The removed hydrocarbons are normally liquified and recombined with the hydrocarbon liquid from which they were vaporized thereby making their recovery economically advantageous.

A particularly suitable process and apparatus for recovering hydrocarbons from air-hydrocarbon vapor mixtures are described in U.S. Pat. No. 4,276,058 issued to Dinsmore on Jun. 30, 1981. The process, referred to herein as the "standard process", basically comprises flowing an inlet air-hydrocarbon vapor mixture through a first bed of solid adsorbent whereby hydrocarbons are adsorbed on the bed and a residue gas stream comprised of substantially hydrocarbon free air which is vented to the atmosphere is produced. A second bed of solid adsorbent having hydrocarbons adsorbed therein is regenerated by vacuum pumping whereby a major portion of the hydrocarbons are desorbed from the bed and a hydrocarbon rich air-hydrocarbon mixture is produced. Hydrocarbon-free air is injected into the bed being regenerated when high vacuum conditions are reached to strip additional hydrocarbons from the bed. A substantial portion of the hydrocarbons are recovered from the hydrocarbon rich air-hydrocarbon mixture produced during the regeneration.

The flow pattern of the inlet air-hydrocarbon vapor mixture is periodically changed whereby when the bed through which the inlet air-hydrocarbon vapor mixture is flowing becomes loaded with adsorbed hydrocarbons, the mixture is caused to flow through the bed which has just been evacuated and stripped. Before the inlet vapor mixture is switched into the just regenerated bed which contains a vacuum, the bed is pressure equalized by allowing atmospheric air to enter the bed. Substantially simultaneously with the switching of the inlet air-hydrocarbon vapor mixture flow pattern, the bed which has just become loaded with adsorbed hydrocarbons is changed to regeneration, i.e., to being evacuated and stripped.

Another particularly suitable process and apparatus for recovering hydrocarbons from air-hydrocarbon vapor mixtures are described in U.S. Pat. No. 5,154,735 issued to Dinsmore, et al. on Oct. 13, 1992. The process, referred to herein as the "high efficiency process", is similar to the above described standard process in that it comprises the steps of flowing the inlet air-hydrocarbon vapor mixture through a first bed of solid adsorbent whereby hydrocarbons are adsorbed on the bed and a residue gas stream comprised of substantially hydrocarbon-free air which is vented to the atmosphere is produced. A second bed of solid adsorbent having hydrocarbons adsorbed thereon is regenerated by vacuum pumping with a liquid seal vacuum pump whereby hydrocarbons are desorbed from the bed and a hydrocarbon rich air-hydrocarbon mixture is produced. A substantial portion of the hydrocarbons are recovered from the hydrocarbon rich air-hydrocarbon vapor mixture produced during the regeneration. The beds of adsorbent are periodically changed from adsorption to regeneration and vice versa as described above in connection with the standard process.

In accordance with the high efficiency process, the second bed is further evacuated by vacuum pumping with a positive displacement booster pump connected upstream and in series with the liquid seal vacuum pump while continuing to pump with the liquid seal vacuum pump. A relatively high rate of hydrocarbon-free air is also injected into the bed being regenerated when high vacuum conditions are reached to strip additional hydrocarbons from the bed. The further evacuation and higher rate of stripping air result in the bed being regenerated to a greater degree and a very low hydrocarbon content in the substantially hydrocarbon-free air vented to the atmosphere.

Heretofore, the adsorption, equalization and regeneration cycle times of hydrocarbon vapor recovery processes of the types described above have typically been short, e.g., about 17 minutes for adsorption, two minutes for equalization and 15 minutes for regeneration. In applications of the hydrocarbon vapor recovery processes where the flow of the inlet air-hydrocarbon vapor mixture is intermittent, e.g., processes for recovering vaporized gasoline light ends and the like from a mixture thereof with air expelled from tank trucks, the cycle times utilized have generally been the same as described above. While different techniques have been utilized to conserve power during periods when no inlet air-hydrocarbon vapor mixture is available to be processed, such techniques heretofore have generally involved shutting the vapor recovery apparatus down at the end of a cycle and restarting it when additional inlet air-hydrocarbon mixture must be processed. However, because the same cycle times are utilized, when the apparatus is operated the vacuum pump or pumps and other powered equipment constantly run and power is constantly being consumed. Thus, there is a need for improved processes and apparatus for recovering hydrocarbons from air-hydrocarbon vapor mixtures which can be operated for long periods of time during which the inlet flow of the air-hydrocarbon vapor mixture is intermittent without operating the regeneration equipment and consuming power.

Hydrocarbon vapor recovery apparatus of the type described herein have heretofore utilized timers or vacuum transmitters to facilitate the control of certain aspects of the process. For example, U.S. Pat. No. 5,591,254 issued to Gibson on Jan. 7, 1997 discloses a vapor recovery apparatus with an automatic flow control system which includes a vacuum transmitter for monitoring pressure within the apparatus at selected points and controlling the operation of the valves in response thereto. While a vacuum transmitter can be utilized in conjunction with a valve controller as described in the Gibson patent, the vacuum transmitter readings are affected by site elevation and variations in atmospheric pressure which causes a certain amount of inherent inaccuracy in the operation of the system. Thus, there is a need for an improved vapor recovery process and apparatus which are controlled in certain aspects by accurate measurements of the pressure levels within the adsorbent beds being regenerated and related equipment.

Finally, in the heretofore utilized vapor recovery apparatus, a three-phase separator has been utilized in conjunction with the liquid seal vacuum pump. The three-phase separator has generally been a vessel divided into two sections by an internal baffle which allows vapor and condensed hydrocarbons to flow over the top of the baffle into the absorber side of the vessel to which an absorber is attached. Such a three-phase separator is described in the above mentioned U.S. Pat. No. 5,154,735. In order to eliminate carry-over of the vacuum pump seal liquid into the absorber side of the vessel, a full diameter wire mesh mist extractor has been employed on the vacuum pump seal fluid side of the vessel to coalesce the seal fluid and eliminate carry-over. When the mist extractor must be serviced and cleaned, it is necessary to enter the vessel which is time consuming and requires a relatively long shut-down time. Thus, there is a need for an improved three-phase separator for use in hydrocarbon vapor recovery apparatus of the type described herein.

SUMMARY OF THE INVENTION

The present invention provides improved processes and apparatus for recovering hydrocarbons from intermittent or continuous inlet air hydrocarbon vapor mixtures which meet the needs described above and overcome the deficiencies of the prior art.

The improved processes of the present invention are basically comprised of the following steps. An inlet air-hydrocarbon vapor mixture is flowed through a first bed of adsorbent whereby hydrocarbons in the mixture are adsorbed on the bed and a residue gas stream comprised of substantially hydrocarbon-free air is produced. The substantially hydrocarbon-free air is vented to the atmosphere and the concentration of hydrocarbons contained in the vented substantially hydrocarbon-free air is continuously monitored. The flow of the inlet air-hydrocarbon mixture through the first bed is continued, either intermittently or continuously, so long as the monitored concentration of hydrocarbons in the vented substantially hydrocarbon-free air is below a predetermined concentration. A second bed of adsorbent having hydrocarbons adsorbed thereon is regenerated by subjecting the bed to pumping with a vacuum pump and air stripping whereby hydrocarbons are desorbed from the bed and a hydrocarbon rich air-hydrocarbon vapor mixture is produced. A major portion of the hydrocarbons are recovered from the hydrocarbon rich air-hydrocarbon vapor mixture and the remaining air-hydrocarbon vapor mixture is combined with the inlet air-hydrocarbon mixture flowing to the first bed of adsorbent. The vacuum pumping and evacuation of the second bed is terminated after a major portion of the hydrocarbons are desorbed therefrom, and the termination is continued for so long as the monitored concentration of hydrocarbons in the substantially hydrocarbon-free air which is vented to the atmosphere is below the predetermined concentration. The process is continued by flowing the inlet air-hydrocarbon mixture through the first bed of adsorbent without further regeneration of the second bed until the monitored concentration of hydrocarbons contained in the vented substantially hydrocarbon-free air equals or exceeds the predetermined concentration, at which time the flow pattern of the inlet air-hydrocarbon mixture is changed whereby it is flowed through the regenerated bed of adsorbent and the bed of adsorbent previously adsorbing hydrocarbons from the inlet vapor mixture is regenerated.

The processes preferably also include the step of monitoring the absolute pressure in the bed of adsorbent being regenerated and the absolute suction pressure of the liquid seal vacuum pump during regeneration. The monitored absolute pressures are utilized in conjunction with an electronic valve and pump controller to introduce stripping gas into the adsorbent bed being evacuated at a preselected absolute pressure level, and for restricting the rate at which hydrocarbons are desorbed from the second bed for an initial time period during the evacuation of the second bed until a preselected absolute pressure is reached in the second bed. Further, when a positive displacement booster pump is utilized in combination with the liquid seal vacuum pump in a high efficiency process, the vacuum pumping by the booster pump is started at a preselected absolute pressure in the adsorbent bed being regenerated and the rate of pumping is restricted for an initial time period after the pumping starts until a preselected absolute suction pressure is reached by the liquid seal vacuum pump.

An improved hydrocarbon rich liquid absorbent accumulator or condensed hydrocarbon accumulator and a three-phase separator for separating vacuum pump seal liquid, condensed hydrocarbons and an air-hydrocarbon vapor mixture from each other are also provided. The accumulator and three-phase separator are separate compartments of a single vessel sealingly divided by a wall therein. A mist extractor is removably disposed across a top outlet connection of the three-phase separator compartment and a dip tube is disposed in the liquid absorbent accumulator compartment sealingly connected to an opening in the wall for conducting condensed hydrocarbons from the three-phase separator compartment to the liquid absorbent accumulator compartment thereof.

It is, therefore, a general object of the present invention to provide an improved hydrocarbon vapor recovery process and apparatus.

Other and further objects, features and advantages of the present invention will be readily apparent to those skilled in the art upon a reading of the description of preferred embodiments which follows when taken into conjunction with the accompanying drawings.

DESCRIPTION OF PREFERRED EMBODIMENTS

Figure 1:
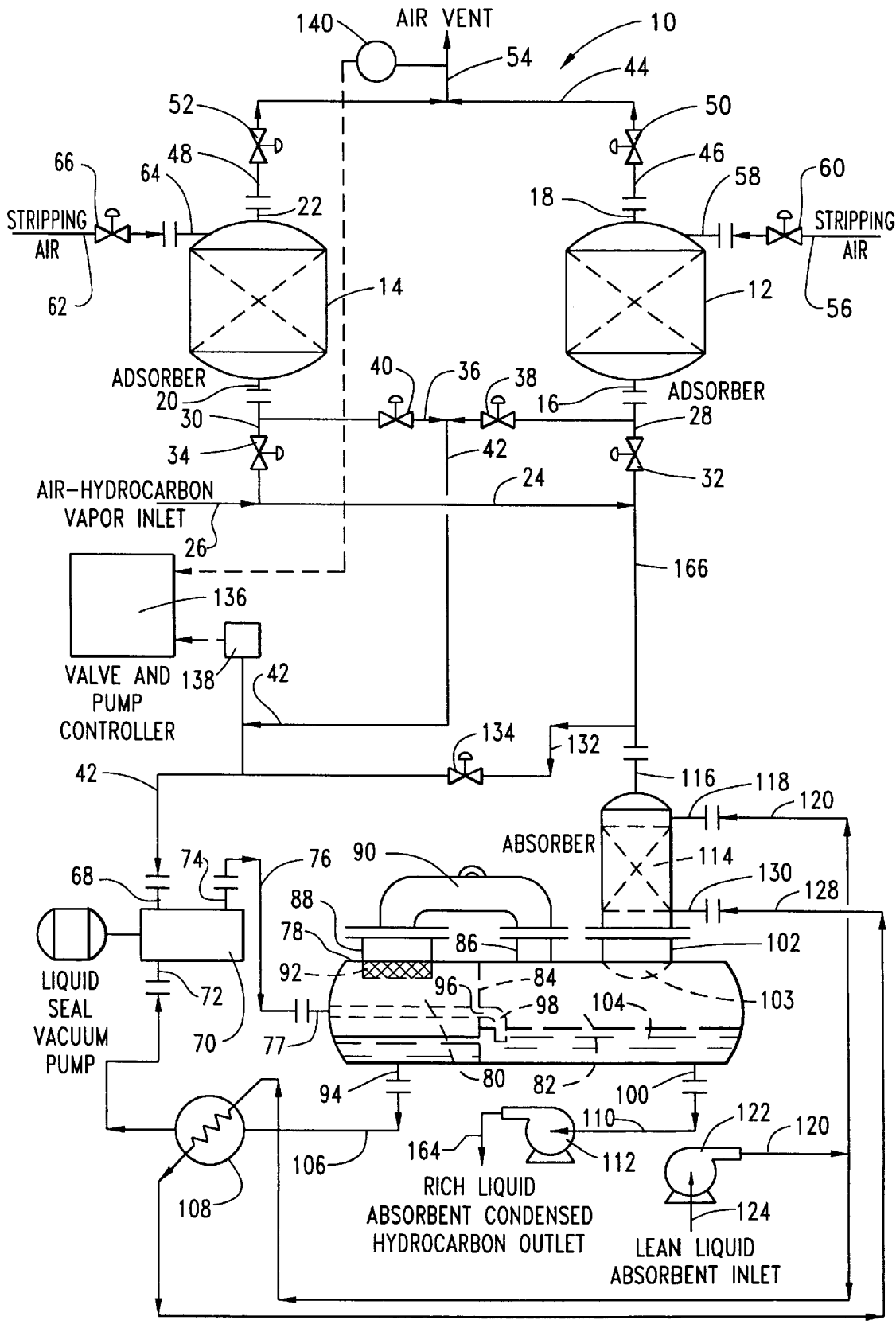
FIG. 1 is a schematic illustration of apparatus for carrying out an improved standard process of the present invention.

Referring now to FIG. 1, apparatus for carrying out an improved standard process of the present invention is illustrated and generally designated by the numeral 10. The apparatus 10 is comprised of a pair of adsorbers 12 and 14, each of which contains a bed of solid adsorbent through which gases can flow. Each of the adsorbers 12 and 14 are closed vessels and include connections on opposite sides of the beds of adsorbent therein. That is, the adsorber 12 includes inlet and outlet connections 16 and 18 and the adsorber 14 includes inlet and outlet connections 20 and 22. While various solid adsorbents having an affinity for hydrocarbons can be utilized in the adsorbers 12 and 14, activated carbon is preferred.

An air-hydrocarbon vapor mixture inlet header 24 is provided connected to a conduit 26 which conducts a mixture of air and hydrocarbon vapor, e.g., gasoline vapor or the like, from a source thereof to the apparatus 10. A pair of conduits 28 and 30 are connected to the header 24 and to the inlet connections 16 and 20 of the adsorbers 12 and 14, respectively. Conventional switching valves 32 and 34 are disposed in the conduits 28 and 30, respectively, and a header 36 is connected to the conduits 28 and 30 at points thereon between the switching valves 32 and 34 and the connections 16 and 20 of the adsorbers 12 and 14. A pair of switching valves 38 and 40 are disposed in the header 36 and a conduit 42 is connected to the header 36 at a point between the switching valves 38 and 40.

A residue gas header 44 is provided and a pair of conduits 46 and 48 are connected to the header 44 and to the connections 18 and 22 of the adsorbers 12 and 14. Switching valves 50 and 52 are disposed in the conduits 46 and 48, respectively, and a conduit 54 is connected to the header 44 for venting substantially hydrocarbon-free air to the atmosphere. A conduit 56 connected to a source of stripping air or other inert gas, which can optionally be heated, is connected to a stripping air inlet connection 58 in the adsorber 12. A switching valve 60 is disposed in the conduit 56. In a like manner, stripping air is conducted to the adsorber 14 by conduit 62 connected to a connection 64 in the adsorber 14. A switching valve 66 is disposed in the conduit 62.

The other end of the conduit 42 connected to the header 36 is connected to the suction connection 68 of a conventional liquid seal vacuum pump 70. The liquid seal vacuum pump 70 also includes a seal liquid inlet connection 72 and a discharge connection 74 from which seal liquid, condensed hydrocarbons and an air-hydrocarbon vapor mixture are discharged as will be further described hereinbelow. A conduit 76 is connected to the discharge connection 74 of the liquid seal vacuum pump 70 and to an inlet connection 77 of a combined three-phase separator and hydrocarbon rich liquid absorbent accumulator vessel 78.

The vessel 78 is divided internally into two separate sealed compartments 80 and 82 by a wall 84. The three-phase separator compartment 80 includes the inlet connection 77 for receiving seal liquid, condensed hydrocarbons and an air-hydrocarbon vapor mixture from the liquid seal vacuum pump 70. The liquid absorbent accumulator compartment 82 and the three-phase separator compartment 80 each include a vapor mixture connection in the top thereof. That is, the liquid absorbent accumulator compartment 82 includes a top connection 86 and the three-phase separator compartment 80 includes a top connection 88. A conduit 90 is sealingly connected to and between the top connections 86 and 88 for conducting a separated air-hydrocarbon vapor mixture from the three-phase separator compartment 80 to the liquid absorbent accumulator compartment 82. A mist extractor 92 is removably disposed across the top outlet connection 88 of the three-phase separator compartment 80 so that when the conduit 90 is removed from the vessel 78, the mist extractor 92 can quickly be inspected and removed and cleaned if necessary. An outlet connection 94 is provided in the bottom of the three-phase separator compartment 80 for removing vacuum pump seal liquid therefrom. An opening 96 is disposed in the wall which sealingly divides the compartments 80 and 82, and a dip tube 98 is disposed in the liquid absorbent accumulator compartment 82 which is sealingly connected to the opening 96 in the wall 84. The dip tube 98 conducts condensed hydrocarbons from the three-phase separator compartment 80 to the bottom of the liquid absorbent accumulator compartment 82. An outlet connection 100 is disposed in the bottom of the liquid absorbent accumulator compartment 82 for removing rich liquid absorbent and condensed hydrocarbons therefrom. An absorber 102 is integrally connected to the top of the vessel 78, but as will be understood by those skilled in the art, the absorber 102 and the vessel 78 can be separate vessels if necessary or desired.

The three-phase separator compartment 80 of the vessel 78 functions to separate the seal liquid utilized for the pump 70, the hydrocarbon rich air-hydrocarbon vapor mixture removed from the bed of adsorbent being regenerated and hydrocarbons which condense therefrom. The seal liquid is typically water containing a freezing point depressant such as ethylene glycol. As indicated above, the separated seal liquid is withdrawn from the compartment 80 by way of the connection 94 thereof and the separated air-hydrocarbon vapor mixture is withdrawn from the compartment 80 by way of the connection 88 at the top of the compartment 80, the mist extractor 92, and the conduit 90. The condensed hydrocarbons which are lighter than the seal liquid and accumulate on top of the seal liquid in the compartment 80 is removed therefrom by way of the opening 96 in the wall 84 and the dip tube 98. The dip tube 98 conducts the condensed hydrocarbons to below the surface of a body 104 of condensed hydrocarbons and rich liquid absorbent accumulated in the bottom of the liquid adsorbent accumulator compartment 82. The separated hydrocarbon rich air-hydrocarbon vapor mixture which flows into the compartment 82 from the three-phase separator compartment 80 flows into the bottom of the absorber 102 as will be described further.

The seal liquid separated in the three-phase separator compartment 80 is withdrawn therefrom by a conduit 106 connected between the connection 94 and the seal liquid inlet connection 72 of the liquid seal vacuum pump 70. A cooler 108 is disposed in the conduit 106 for cooling the seal liquid as it flows therethrough. While the cooler 108 can be of various types and designs, a heat exchanger which cools the seal liquid by passing it in heat exchange relationship with a stream of lean liquid used as the absorption medium in the absorber 102 is preferred and generally is the most economical.

A conduit 110 is connected to the outlet connection 100 of the rich liquid absorbent accumulator compartment 82 and to a pump 112. The discharge of the pump 112 is connected to a conduit 164 which leads the rich liquid absorbent and condensed hydrocarbon liquid mixture withdrawn from the compartment 82 to a storage facility (not shown).

The absorber 102 is connected to an opening 103 in the top of the liquid absorbent accumulator 82. The absorber 102 includes means disposed therein for bringing about intimate contact between a liquid adsorbent flowing downwardly therein and a vapor mixture flowing upwardly therein. Such means can be comprised of vapor-liquid contact trays or any of a variety of conventional packing material. Preferably, the absorber 102 includes a section of packing material 114 disposed in the top portion thereof for bringing about the intimate contact. A residue gas outlet connection 116 and a lean liquid absorbent inlet connection 118 are provided above the packed section 114. The hydrocarbon rich liquid absorbent from the absorber 102 enters the compartment 82 by way of the opening 103 therein. The hydrocarbon rich liquid absorbent accumulates in the compartment 82 along with condensed hydrocarbon liquid which enters the compartment 82 by way of the dip tube 98 from the three-phase separator compartment 80 as previously described.

The separated hydrocarbon rich air-hydrocarbon mixture produced from the regeneration of an adsorbent bed flows from the compartment 82 upwardly through the open bottom of the absorber 102 into contact with liquid absorbent flowing downwardly therein whereby hydrocarbons are absorbed and removed from the vapor mixture and a residue gas stream comprised of air and a minor portion of hydrocarbons is produced.

A conduit 120 is connected to the lean liquid absorbent inlet connection 118 of the absorber 102 and to the discharge connection of a pump 122. A conduit 124 is connected to the suction connection of the pump 122 which leads a stream of lean liquid absorbent from a source thereof such as a storage tank to the pump 122. A conduit 126 connected to the conduit 120 conducts a slip stream of lean liquid absorbent to the heat exchanger 108 wherein it exchanges heat with and cools the seal liquid flowing to the liquid seal vacuum pump 70. A conduit 128 conducts the lean liquid absorbent from the heat exchanger 108 to an inlet connection 130 in the absorber 102.

As mentioned above, when it is necessary to inspect and/or clean the mist extractor 92 removably disposed within and across the outlet connection 88 of the three-phase separator compartment 80, the conduit 90 is disconnected from the connections 88 and 86 and removed therefrom. The mist extractor 92 is removed from the vessel 78, inspected, cleaned and/or replaced, and the conduit 90 is reconnected to the connections 88 and 86.

Because of the presence of the mist extractor 92 and because the three-phase separator and hydrocarbon rich liquid absorbent compartments are sealingly separated, carry-over of seal liquid between the compartments is prevented. Further, because the dip tube 98 conducts condensed liquid hydrocarbons from the three-phase separator compartment 80 to below the surface of the body of liquid 104 in the compartment 82, the air-hydrocarbon vapor mixture separated in the compartment 80 must flow through the mist extractor 92 and conduit 90 and is prevented from flowing between the compartments 80 and 82 within the vessel 78.

The residue gas stream produced in the absorber 102 exits the absorber 102 by way of the connection 116 thereof and flows through a conduit 166 connected between the connection 116 and the inlet air-hydrocarbon vapor header 24. A conduit 132 for recycling an air-hydrocarbon vapor mixture through the liquid seal vacuum pump 70 during the pressure equalizing cycle is connected between the conduit 166 and the conduit 42. A switching valve 134 is disposed in the conduit 132.

A conventional electronic valve and pump controller 136 is provided for operating the switching valves 32, 34, 38, 40, 50, 52, 60, 66 and 134 as well as the liquid seal vacuum pump 70 and the liquid absorbent pumps 112 and 122 in a manner which will be described further hereinbelow. A particularly suitable such controller is a Programmable Logic Controller commercially available from the General Electric Corp. under the trade designation "GE 9030®". An absolute pressure transmitter 138 is connected to the conduit 42 to thereby sense the absolute suction pressure of the liquid seal vacuum pump 70 and the absolute pressure in the adsorbent bed being regenerated. The output signal from the transmitter is connected to the valve and pump controller 136. The use of an absolute pressure transmitter instead of a conventional vacuum transmitter eliminates errors introduced by changes in elevation and atmospheric pressure. A particularly suitable absolute pressure transmitter is commercially available from the Rosemount Company under the trade designation "Rosemount Model 2088A-1-A-22-A-1-B4-E5-M7®". Also, a hydrocarbon concentration monitor 140 is connected to the substantially hydrocarbon-free air vent conduit 54 and the output signal therefrom is connected to the valve and pump controller 136.

OPERATION OF THE APPARATUS 10

In operation of the apparatus 10, the switching valves 32, 34, 38, 40, 50 and 52, are operated by the valve and pump controller 136 in a manner whereby the inlet air-hydrocarbon vapor mixture is caused to flow through one of the adsorbers 12 or 14 while the other of the adsorbers is being regenerated. For example, during a first cycle, the switching valve 34 is open and the switching valve 32 is closed whereby the inlet air-hydrocarbon vapor mixture flows into the adsorber 14 from the header 24 by way of the conduit 30, the switching valve 34 therein and the connection 20 in the adsorber 14. Because the switching valve 32 disposed in the conduit 28 is closed, the inlet air-hydrocarbon vapor mixture is prevented from entering the adsorber 12. The switching valve 52 disposed in the conduit 48 is also open and the switching valve 50 disposed in the conduit 46 is closed whereby the residue gas stream produced in the adsorber 14 exits the adsorber 14 by way of the connection 22 thereof, the conduit 48 and the switching valve 52 and enters the header 44. From the header 44, the residue gas stream flows through the conduit 54 from where it is vented to the atmosphere. The switching valve 40 disposed in the header 36 is closed and the switching valve 38 disposed therein is open whereby the adsorbent bed within the adsorber 12 is communicated with the suction connection 68 of the liquid seal vacuum pump 70 by way of the connection 16 of the adsorber 12, the header 36, the open switching valve 38 and the conduit 42. The switching valve 66 disposed in the stripping air conduit 62 connected to the stripping air inlet connection 64 of the adsorber 14 is closed. The switching valve 60 disposed in the stripping air conduit 56 connected to the stripping air inlet connection 58 of the adsorber 12 is initially closed and then opened during a later part of the regeneration of the bed of adsorbent in the adsorber 12 as will be further described herein below.

During a first part of the cycle when the switching valves are in the mode described above, the inlet air-hydrocarbon vapor mixture flows through the bed of adsorbent within the adsorber 14 so that hydrocarbons are adsorbed on the bed and removed from the mixture. The residue gas produced which is comprised of substantially hydrocarbon-free air is vented to the atmosphere by way of the air vent pipe 54. Simultaneously, the bed of adsorbent disposed within the adsorber 12 is evacuated by the liquid seal vacuum pump 70 whereby hydrocarbons are desorbed therefrom. A hydrocarbon rich air-hydrocarbon vapor mixture is withdrawn from the adsorbent bed within the adsorber 12 which flows through the vacuum pump 70. Cooled seal liquid, preferably water containing a freezing point depressant such as ethylene glycol, flows into the vacuum pump 70 by way of the inlet connection 72 thereof and is discharged by way of the discharge connection 74 along with the hydrocarbon-rich air-hydrocarbon vapor mixture and hydrocarbons condensed therefrom. That is, the intimate contact of the hydrocarbon-rich air-hydrocarbon vapor mixture with the cool seal liquid while flowing through the vacuum pump 70 cools the vapor mixture and causes hydrocarbons contained therein to be condensed. Thus, a stream of hydrocarbon-rich air-hydrocarbon vapor mixture containing seal liquid and condensed hydrocarbon liquids exits the pump 70 and flows through the conduit 76 into the three-phase separator compartment 80 of the vessel 78. While passing through the separator compartment 80, the air-hydrocarbon vapor mixture, seal liquid and condensed hydrocarbon liquids are separated from each other as previously described. The seal liquid which is discharged from the three-phase separator compartment 80 by way of the connection 94 thereof and the conduit 106 is continuously circulated between the three-phase separator compartment 80, the seal liquid cooler 108 and the vacuum pump 70 while the vacuum pump 70 is operating. As also mentioned, the separated condensed hydrocarbons flow into the accumulator compartment 82 of the vessel 78 by way of the dip tube 98 where they combine with rich liquid absorbent flowing into the compartment 82 from the absorber 102. The condensed hydrocarbons and rich liquid absorbent are removed from the compartment 82 by way of the connection 100 thereof, the conduit 110 and the pump 112. From the pump 112, the rich liquid absorbent-condensed hydrocarbon liquid mixture is conducted by way of a conduit 164 to storage facilities or a point of further processing (not shown).

A first stream or portion of lean liquid absorbent is pumped from a source thereof by the pump 122 to the seal liquid cooler 108 by the conduits 120 and 126. The first portion of the liquid absorbent which is heated in the cooler 108 is conducted therefrom by the conduit 128 and flows into the absorber 102 by way of the inlet connection 130 located in a lower portion of the absorber 102. The first portion of liquid absorbent is intimately contacted with the hydrocarbon-rich air-hydrocarbon vapor mixture flowing upwardly in the absorber 102. A second stream or portion of the lean liquid absorbent is pumped by the pump 122 and flows by way of the conduit 120 and the connection 118 in the upper portion of the absorber 102 into the absorber 102. The second portion of the lean liquid absorbent flows downwardly within the absorber 102 through the packed section 114 thereof and intimately contacts the air-hydrocarbon vapor mixture flowing upwardly therethrough. As the hydrocarbon rich air-hydrocarbon vapor mixture flows upwardly through the absorber 102, it is contacted by the liquid absorbent flowing downwardly therein whereby hydrocarbons are absorbed in the liquid absorbent and removed from the vapor mixture and the hydrocarbon-rich liquid absorbent which flows into the accumulator compartment 82 is produced. A residue gas stream comprised of air and a minor portion of hydrocarbons is also produced which exits the absorber 102 by way of the discharge connection 116 in the top thereof. The residue gas stream is conducted by the conduit 166 into the header 24 where it combines with the inlet air-hydrocarbon vapor mixture and flows through the adsorber 14. As will be understood, the hydrocarbons contained in the residue gas stream are adsorbed on the bed of adsorbent within the adsorber 14 along with hydrocarbons from the inlet air-hydrocarbon vapor mixture.

During a later part of the cycle, after a major portion of hydrocarbons adsorbed on the bed of adsorbent within the adsorber 14 have been desorbed therefrom by the operation of the vacuum pump 70, the stripping air switching valve 60 in the conduit 56 is opened whereby a quantity of hydrocarbon-free air from the atmosphere enters the conduit 56 and flows into the adsorber 12. The hydrocarbon-free air flows through the bed of adsorbent within the adsorber 12 which is at high vacuum condition and causes additional hydrocarbons to be stripped from the bed which were not desorbed therefrom by vacuum pumping alone.

In accordance with the present invention, the concentration of hydrocarbons in the substantially hydrocarbon-free air vented to the atmosphere by way of the air vent 54 is continuously monitored by the hydrocarbon concentration monitor 140 connected to the vent pipe 54. As mentioned above, the output signal from the hydrocarbon monitor 140 is connected to the valve and pump controller 136 and so long as the monitored hydrocarbon concentration in the vent stream is below a predetermined concentration, the flow of inlet air-hydrocarbon vapor mixture through the bed of adsorbent in the adsorber 14 is continued.

After the bed of adsorbent in the adsorber 12 has been regenerated by pumping with the liquid seal vacuum pump 70 and stripping with stripping air whereby a major portion of the hydrocarbons are desorbed from the bed, the regeneration of the bed of adsorbent in the adsorber 12 is terminated. That is, the liquid seal vacuum pump 70 and the liquid absorbent pumps 112 and 122 are shut-down. Thereafter, the flow of the inlet air-hydrocarbon vapor mixture through the bed of adsorbent in the adsorber 14 and the shut-down of the above mentioned regeneration pumps is continued for so long as the monitored concentration of hydrocarbons in the vented substantially hydrocarbon-free air is below the predetermined concentration.

When the monitored concentration of hydrocarbons in the vented substantially hydrocarbon-free air becomes equal to or above the predetermined concentration, the vacuum which exists in the regenerated bed of adsorbent within the adsorber 12 is equalized by closing the switching valve 38 in the header 36 and starting the liquid seal vacuum pump 70 and absorbent pumps 112 and 122. The absolute pressure transmitter 138 monitors the absolute suction pressure of the liquid seal vacuum pump 70 and sends an output signal to the valve and pump controller 136. At a preselected absolute vacuum pump suction pressure, the controller 136 opens the valve 134 in the conduit 132 whereby an air-hydrocarbon vapor mixture is recycled through the liquid seal vacuum pump during the time that the switching valve 38 is closed and the regeneration system is isolated from the adsorbers 12 and 14. The controller 136 slowly opens the switching valve 50 in the conduit 46 whereby substantially hydrocarbon-free air is allowed to back-flow from the header 44 into the adsorber 12 by way of the connection 18 thereof. When the pressure within the adsorber 12 reaches substantially atmospheric pressure, the switching valve 32 in the conduit 28 is opened and the switching valve 34 in the conduit 30 is closed whereby the inlet air-hydrocarbon vapor mixture flows through the regenerated bed of adsorbent in the adsorber 12. Substantially simultaneously therewith, the switching valve 52 in the conduit 48 is closed, and thereafter, the switching valve 40 in the header 36 slowly opens whereby the bed of adsorbent within the adsorber 14 is regenerated by evacuation and stripping as described above. Once the switching valve 40 has initially opened whereby the bed of adsorbent within the adsorber 14 has begun to be evacuated, the switching valve 134 in the conduit 132 is closed whereby the recycle of the air-hydrocarbon vapor mixture between the vacuum pump 70 and the vessel 78 and adsorber 102 is terminated until the next equalization cycle. After the beds of adsorbent have changed, the above described procedure is repeated whereby the bed adsorbing hydrocarbons from the inlet air-hydrocarbon vapor mixture is continued so long as the monitored hydrocarbon concentration of the vented substantially hydrocarbon-free air remains below the predetermined concentration and after the other bed of absorbent is regenerated, the regeneration system is shut-down to conserve the consumption of power.

As will now be understood by those skilled in the art, the flow pattern of the inlet air-hydrocarbon vapor mixture and the bed being regenerated are changed or cycled based on the monitored hydrocarbon concentration in the substantially hydrocarbon-free air vented to the atmosphere. That is, after equalization as described above, the inlet mixture is cause to flow through the bed which has just been regenerated and the bed which has just adsorbed hydrocarbons from the inlet mixture is subjected to regeneration. The hydrocarbon-rich air-hydrocarbon vapor mixture produced from the bed being regenerated is contacted with liquid absorbent in the absorber 102 whereby a major portion of the hydrocarbons therein are recovered.

As previously described, the absolute pressure in the bed being regenerated is monitored by the absolute vacuum transmitter 138. If the absolute regeneration pressure is too high at the end of a regeneration cycle, the pump and valve controller 136 displays a warning to that effect whereby the operator of the apparatus 10 can take appropriate steps to remedy the situation. Also, the controller 136 uses the absolute regeneration pressure monitored by the absolute vacuum transmitter 138 to slowly stage open the regeneration switching valves 38 and 40 as described above. That is, at the beginning of each regeneration cycle, one of the regeneration switching valve 38 or 40 is initially slowly opened based on the monitored absolute regeneration pressure so that the vacuum pump 70 and other parts of the regeneration system are not overloaded. The slow staged opening of the regeneration valves restricts the rate at which hydrocarbons are desorbed from the bed of adsorbent being regenerated for an initial time period during the regeneration cycle.

As will also now be understood, in accordance with the present invention, the inlet air-hydrocarbon vapor mixture which can be intermittent or continuous is allowed to flow through the bed of adsorbent which is adsorbing hydrocarbons from the mixture for as long as the monitored hydrocarbon concentration in the vented substantially hydrocarbon-free air is below a preselected concentration. After the bed being regenerated has been subjected to regeneration for a normal cycle time, the regeneration can optionally be extended for an additional time to insure that the bed is fully regenerated. The regeneration equipment is then shut-down and can remain shut-down until the predetermined hydrocarbon concentration in the vented substantially hydrocarbon-free air is exceeded whereupon the beds are changed and the procedure repeated.

The process of the present invention is preferably controlled (by the controller 136) whereby if during any regeneration cycle, the predetermined hydrocarbon concentration of the vented substantially hydrocarbon-free air is equaled or exceeded, the regeneration of the bed of adsorbent in progress will continue to the end of a first normal cycle. If the bed being regenerated is in an extended cycle, the beds of adsorbent are immediately switched. The process can optionally be controlled to switch the beds after a relatively long time period even if the hydrocarbon concentration in the vented substantially hydrocarbon-free air has not been equaled or exceeded. For example, the valve controller 136 can be set to switch the beds on a time cycle in the range of from about 1 hour to about 24 hours, preferably about 12 hours, even though the hydrocarbon concentration of the vented stream has not been equaled or exceeded.

Figure 2:
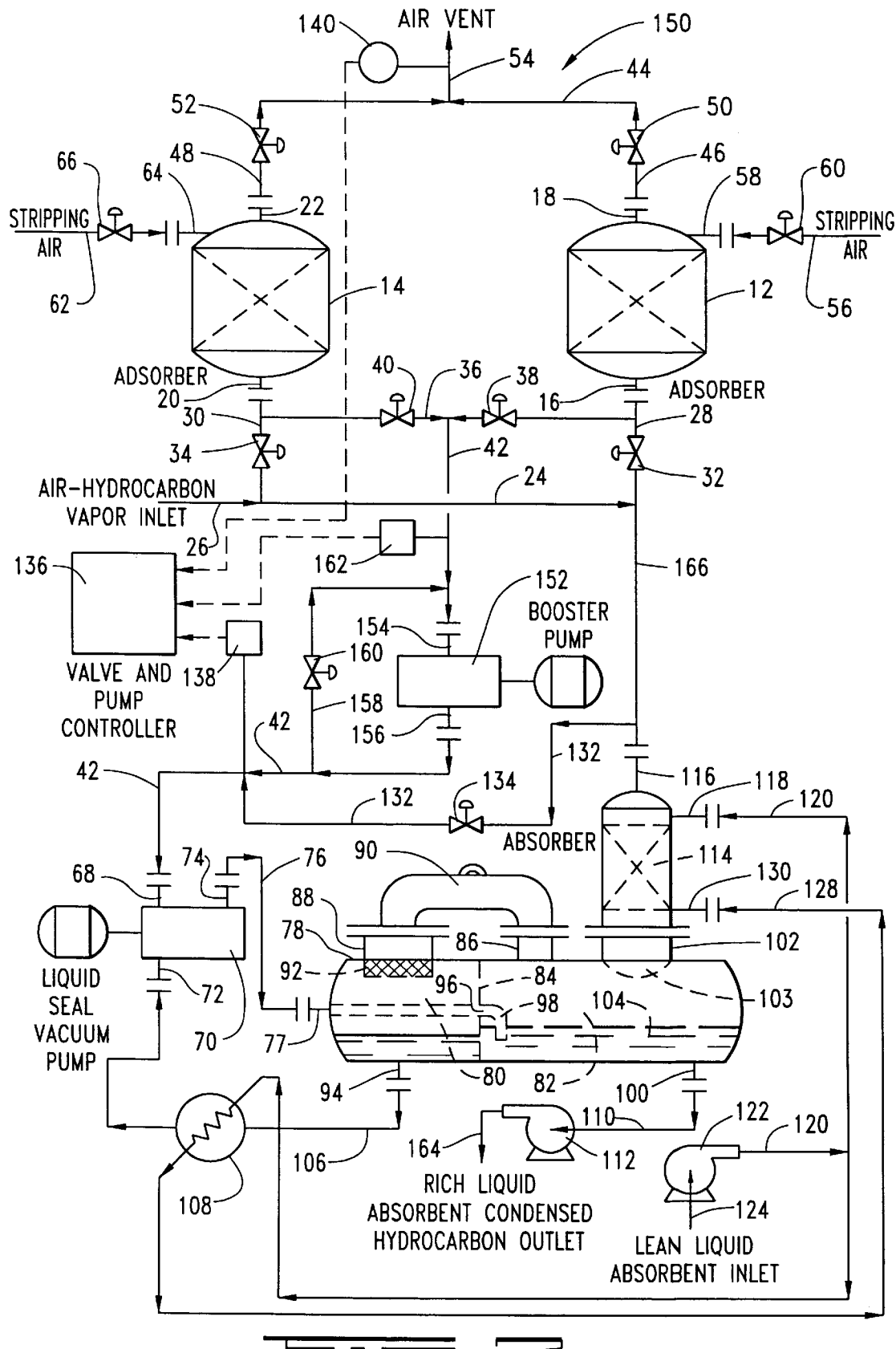
FIG. 2 is a schematic illustration of apparatus for carrying out a high efficiency process of the present invention.

Referring now to FIG. 2, apparatus for carrying out an improved high efficiency process of the present invention is illustrated and generally designated by the numeral 150. The apparatus 150 is identical to the apparatus 10 previously described except for the addition of a second absolute pressure transmitter 162 the output signal of which is connected to the controller 136, a positive displacement booster pump 152, a conduit 158 and a spill-back valve 160 utilized with the booster pump 152. Accordingly, FIG. 2 includes a number of the same character references as are used in FIG. 1 which refer to the same parts as those shown in FIG. 1.

The positive displacement booster pump 152 includes an inlet connection 154 and an outlet connection 156, and the booster pump is disposed in the conduit 42 upstream and in series with the liquid seal vacuum pump 70. The conduit 158 is connected to the conduit 42 on both sides of the booster pump 152 and the spill-back control valve 160 is disposed in the conduit 158. The second absolute pressure transmitter 162 is connected to the conduit 42 upstream of the booster pump 152 so that it continuously monitors the absolute pressure in the adsorber being regenerated. The absolute pressure transmitter 138 continuously monitors the absolute suction pressure of the liquid seal vacuum pump 70.

OPERATION OF THE APPARATUS 150

The operation of the apparatus 150 illustrated in FIG. 2 is identical to the above described operation of the apparatus 10 with respect to the periodic changing of the flow pattern of the inlet air-hydrocarbon vapor mixture and the switching of the beds of adsorbent from adsorbing hydrocarbons to regeneration. The operations of the liquid seal vacuum pump 70, the three-phase separator compartment 80 of the vessel 78, the condensed hydrocarbon and rich liquid absorbent accumulator compartment 82 of the vessel 78, the absorber 102, the liquid absorbent pumps 112 and 122, the cooler 108 and the recycle valve 134 in the conduit 132 are also identical to the operations of such apparatus described in connection with the apparatus 10.

During the regeneration of a bed of adsorbent, e.g., the bed of adsorbent in the adsorber 12, the bed of adsorbent is first evacuated by the liquid seal vacuum pump 70 whereby hydrocarbons are desorbed therefrom. A hydrocarbon rich air-hydrocarbon vapor mixture is withdrawn from the adsorbent bed within the adsorber 12 which flows through the vacuum pump 70 as described above in connection with the apparatus 10. During this first part of the regeneration cycle, the booster pump 152 is continuously operated, but the spill-back valve 160 disposed in the conduit 158 is open whereby the booster pump 152 is unloaded and the vacuum created in the absorber 12 is produced by the liquid seal vacuum pump 70 alone. During the regeneration cycle, the valve and pump controller 136 slowly stage closes the spill-back valve 160. The slow staged closing of the spill-back valve 160 restricts the rate of pumping by the booster pump 152 for an initial time period after it begins pumping until a preselected absolute suction pressure as monitored by the transmitter 138 is reached by the liquid seal vacuum pump 70. The slow closing of the spill-back valve 160 brings about maximum pumping capacity without overloading the liquid seal vacuum pump 70 and the downstream components of the regeneration apparatus. Once the spill-back valve 160 is fully closed and the booster pump 152 is fully loaded, a suction is produced in addition to the suction produced by the liquid seal vacuum pump 70 which is exerted on the bed of adsorbent within the adsorber 12 thereby creating a deeper vacuum, further evacuating the bed of adsorbent within the adsorber 12 and causing additional hydrocarbons to be desorbed therefrom.

During the last part of the regeneration cycle, after a major portion of hydrocarbons adsorbed on the bed of adsorbent within the adsorber 12 have been desorbed therefrom by the operation of the liquid seal vacuum pump 70 and the booster pump 152, the switching valve 60 in the stripping air conduit 56 is opened whereby a quantity of hydrocarbon free stripping air flows into the adsorber 12. As described above in connection with the apparatus 10, the stripping air flows through the bed of adsorbent contained in the adsorber 12 and is withdrawn therefrom by the booster pump 152 and the liquid seal vacuum pump 70.

As mentioned, the absolute pressure transmitter 138 continuously monitors the vacuum pump suction pressure. It also opens the vacuum control valve 134 during the pressure equalization cycle as described above with respect to the apparatus 10. The second absolute pressure transmitter 162 functions in conjunction with the valve and pump controller 136 to open the stripping air control valves 60 or 66 when a predetermined absolute regeneration pressure is reached in the adsorbent bed being regenerated. It also functions in conjunction with the controller 136 to stage open the regeneration valves 38 or 40 whereby the rate at which hydrocarbons are desorbed from the bed of adsorbent being regenerated is restricted for an initial time period until a preselected absolute pressure is reached. Finally, the second absolute pressure transmitter 162 monitors the regeneration pressure and the controller 136 displays a warning if it is too high after a predetermined time.

The overall operation of the apparatus 150 and the process carried out thereby is the same as the operation described above in connection with the apparatus 10. Thus, the flow pattern of the inlet air-hydrocarbon vapor mixture and the bed being regenerated are changed, i.e., cycled, based on the continuously monitored hydrocarbon concentration in the substantially hydrocarbon-free air vented to the atmosphere. Also, the inlet air-hydrocarbon vapor mixture which can be intermittent or continuous is allowed to flow through the bed of adsorbent which is adsorbing hydrocarbons for as long as the monitored hydrocarbon concentration in the vented substantially hydrocarbon-free air is below a preselected concentration. During that time and after the bed of adsorbent being regenerated has been subjected to regeneration for at least a normal cycle time, the liquid seal vacuum pump 70, the booster pump 152 and the liquid absorbent pumps 112 and 122 are shut-down to conserve power.

Figure 3:
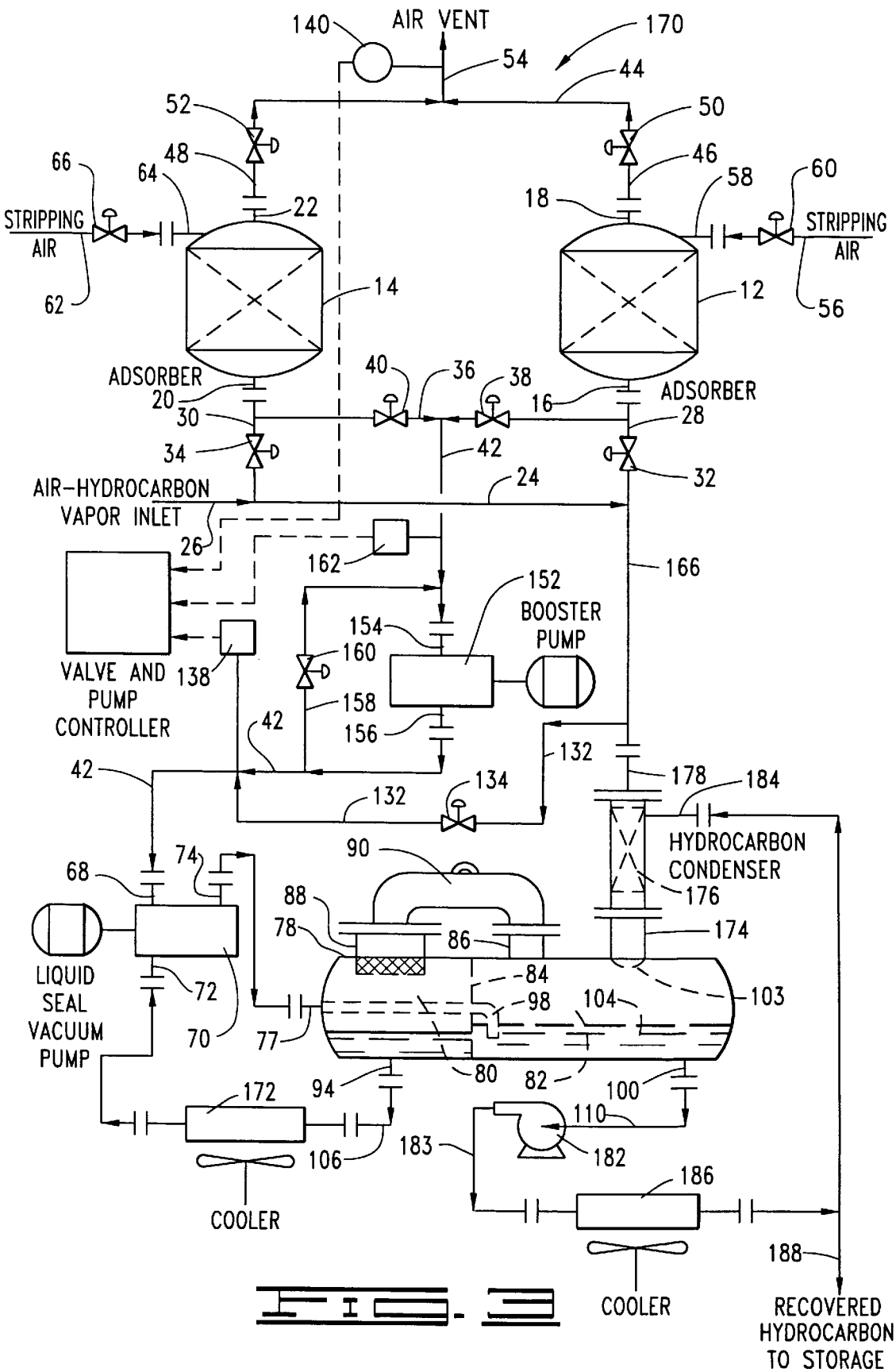
FIG. 3 is a schematic illustration of an alternate form of apparatus for carrying out a high efficiency process of the present invention.

Referring now to FIG. 3, an alternate apparatus for carrying out the improved high efficiency process of the present invention is illustrated and generally designated by the numeral 170. The apparatus 170 is identical to the apparatus 150 illustrated in FIG. 2 and described above except that an air cooler 172 is substituted for the cooler 108, a hydrocarbon condenser 174 is substituted for the absorber 102, a single condensed hydrocarbon pump 182 is substituted for the two liquid absorbent pumps 112 and 122, an air cooler 186 is utilized to cool condensed hydrocarbons withdrawn from the accumulator compartment 82 of the vessel 78, a portion of the cooled condensed hydrocarbons is circulated to the hydrocarbon condenser by a conduit 184 and a portion of the cooled condensed hydrocarbons is conducted to storage by a conduit 188.

OPERATION OF THE APPARATUS 170

Referring to FIG. 3 wherein the same character references as used in FIG. 2 refer to the same parts as those shown in FIG. 2, the operation of the apparatus 170 is identical to the operation of the apparatus 150 described above except for the operation of the hydrocarbon condenser 176, the pump 182 and the air coolers 172 and 186. While the hydrocarbon condenser and related equipment is illustrated in FIG. 3 as a part of a high efficiency process and apparatus, it will be understood by those skilled in the art that the hydrocarbon condenser and related equipment can also be substituted in the process and apparatus of FIG. 1.

The operation of the liquid seal vacuum pump 70, the three-phase separator compartment 80 of the vessel 78 and the accumulator compartment 82 of the vessel 78 are the same as described above in connection with the apparatus 10 and 150. Instead of being cooled by a cooler (heat exchanger) 108, the seal liquid flowing through the conduit 106 from the three-phase separator compartment 80 to the inlet connection 72 of the liquid seal vacuum pump 70 is cooled by an air cooler 172.

When the hydrocarbons contained in the inlet air-hydrocarbon vapor mixture are readily condensed and separated, a condensing process and apparatus can be used instead of a liquid absorbent process and apparatus. That is, condensed hydrocarbons conducted from the accumulator compartment 82 of the vessel 78 are pumped by the pump 182 by way of the conduit 183 through the air cooler 186 whereby the condensed hydrocarbons are cooled. A first portion of the cooled condensed hydrocarbons are conducted by the conduit 184 to the upper portion of the condenser 174. A second portion of the cooled condensed hydrocarbons are conducted to storage (not shown) by the conduit 188. The air-hydrocarbon vapor mixture separated in the separator compartment 80 which flows into the accumulator compartment 82 flows upwardly through the hydrocarbon condenser 174 and is intimately contacted in a packed section 176 thereof by the downwardly flowing cooled condensed hydrocarbon liquid. This causes a major portion of the hydrocarbon vapor contained in the upwardly flowing mixture to be condensed and separated from the mixture. The separated condensed hydrocarbon liquid passes into the accumulator compartment 82 where it mixes with other condensed hydrocarbon liquids therein and from where it is removed by way of the outlet connection 100, the conduit 110 and the pump 182. The remaining mixture of air and hydrocarbon vapor exits the condenser 174 by way of an outlet connection 178 therein and is conducted by the conduit 166 to the header 124 as previously described.

Thus, the present invention is well adapted to carry out the objects and advantages mentioned as well as those which are inherent therein. While numerous changes may be made to the invention by those skilled in the art, such changes are encompassed within the spirit of the invention as defined by the appended claims.

What is claimed is:

1. An improved process for recovering hydrocarbons from an intermittent or continuous inlet air-hydrocarbon vapor mixture comprising the steps of:

(a) flowing said air-hydrocarbon vapor mixture through a first bed of adsorbent whereby said hydrocarbons in said mixture are adsorbed on said bed and a residue gas stream comprised of substantially hydrocarbon-free air is produced;

(b) venting said substantially hydrocarbon-free air to the atmosphere;

(c) monitoring the concentration of hydrocarbons contained in said vented substantially hydrocarbon-free air;

(d) continuing to flow said inlet air-hydrocarbon vapor mixture through said first bed so long as said concentration of hydrocarbons monitored in accordance with step (c) is below a predetermined concentration;

(e) evacuating a second bed of adsorbent having hydrocarbons adsorbed thereon by subjecting said bed to pumping with a vacuum pump whereby hydrocarbons are desorbed from said bed and a hydrocarbon rich air-hydrocarbon vapor mixture is produced;

(f) recovering a major portion of said hydrocarbons from said hydrocarbon rich air-hydrocarbon vapor mixture produced in accordance with step (e) and combining the remaining air-hydrocarbon vapor mixture with said inlet air-hydrocarbon vapor mixture of step (a);

(g) terminating said pumping with said vacuum pump and said evacuation of said second bed in accordance with step (e) after a major portion of said hydrocarbons are desorbed therefrom, and continuing said pumping termination for so long as said concentration of hydrocarbons monitored in accordance with step (c) is below said predetermined concentration;

(h) changing the flow pattern of said inlet air-hydrocarbon vapor mixture whereby it flows through the bed of adsorbent which has been evacuated in accordance with step (e) and changing the bed of adsorbent to be evacuated to the bed of adsorbent which has been adsorbing hydrocarbons in accordance with step (a) when said concentration of hydrocarbons monitored in accordance with step (c) is equal to or above said predetermined concentration; and (i) repeating steps (a) through (h).

2. The process of claim 1 wherein said adsorbent is activated carbon.

3. The process of claim 1 wherein said vacuum pump utilized in step (e) is a liquid seal vacuum pump.

4. The process of claim 3 which further comprises evacuating said second bed in accordance with step (e) further by subjecting said second bed to pumping with a positive displacement vacuum booster pump connected upstream and in series with said liquid seal vacuum pump while continuing to pump with said liquid seal vacuum pump.

5. The process of claim 4 which further comprises the step of monitoring the absolute suction pressure of the liquid seal vacuum pump during step (e).

6. The process of claim 5 which further comprises the step of restricting the rate of pumping by said positive displacement booster pump for an initial time period after it begins pumping during step (e) until a preselected absolute suction pressure is reached by the liquid seal vacuum pump.

7. The process of claim 1 wherein said hydrocarbons are recovered from said hydrocarbon rich air-hydrocarbon vapor mixture in accordance with step (f) by contacting said hydrocarbon rich air-hydrocarbon vapor mixture in an absorber with a lean liquid absorbent having an affinity for hydrocarbons whereby said hydrocarbons are absorbed by said liquid absorbent.

8. The process of claim 1 wherein said hydrocarbons are recovered from said hydrocarbon rich air-hydrocarbon vapor mixture in accordance with step (f) by condensing and separating said hydrocarbons from said hydrocarbon rich air-hydrocarbon vapor mixture.

9. The process of claim 1 which further comprises the step of introducing a quantity of hydrocarbon-free air into said second bed while evacuating said second bed in accordance with step (e) whereby additional hydrocarbons are stripped from said bed.

10. The process of claim 1 which further comprises the step of performing step (h) after a selected time period even though said concentration of hydrocarbons monitored in accordance with step (c) has not equaled or exceeded said predetermined concentration.

11. The process of claim 10 wherein said selected time period is in the range of from about 1 hour to about 24 hours.

12. The process of claim 1 which further comprises the step of equalizing the pressure between said second bed and the atmosphere after step (g) and before step (h).

13. The process of claim 12 which further comprises the step of flowing said air-hydrocarbon vapor mixture through said vacuum pump during said equalizing step.

14. The process of claim 1 which further comprises the step of monitoring the absolute pressure in said second bed of adsorbent during step (e).

15. The process of claim 14 which further comprises the step of introducing a quantity of stripping air into said second bed of adsorbent while evacuating said second bed in accordance with step (e) when said second bed reaches a preselected absolute pressure level.

16. The process of claim 14 which further comprises the step of restricting the rate at which hydrocarbons are desorbed from said second bed of adsorbent for an initial time period during the evacuation of said second bed in accordance with step (e) until a preselected absolute pressure is reached in said second bed.

17. In an apparatus for recovering hydrocarbons from an inlet air-hydrocarbon vapor mixture which includes at least two adsorbers containing beds of solid adsorbent having an affinity for hydrocarbons, a liquid seal vacuum pump for removing adsorbed hydrocarbons and air from the beds of adsorbent, an absorber for absorbing the removed hydrocarbons in a liquid absorbent having a hydrocarbon-rich liquid absorbent accumulator portion, a three-phase separator for separating vacuum pump seal liquid, condensed hydrocarbons and an air-hydrocarbon vapor mixture from each other, and valve and conduit means for periodically changing the flow pattern of the inlet air-hydrocarbon vapor mixture and the bed of adsorbent being evacuated so that the bed of adsorbent just evacuated adsorbs hydrocarbons from the inlet air-hydrocarbon vapor mixture and the bed of adsorbent just adsorbing hydrocarbons is equalized and then evacuated, the improvement which comprises:

said hydrocarbon rich liquid absorbent accumulator portion of said absorber and said three-phase separator being separate compartments of a single vessel sealingly divided by a wall therein;

said three-phase separator compartment including an inlet connection for receiving seal liquid, condensed hydrocarbons and an air-hydrocarbon vapor mixture from said liquid seal vacuum pump;

each of said liquid absorbent accumulator and three-phase separator compartments including a vapor mixture connection in the top thereof;

a conduit removably and sealingly connected to and between said vapor mixture connections for conducting said separated air-hydrocarbon vapor mixture from said three-phase separator compartment to said liquid absorbent accumulator compartment;

a mist extractor removably disposed across said vapor mixture connection in said three-phase separator compartment;

an outlet connection in the bottom portion of said three-phase separator compartment for removing vacuum pump seal liquid therefrom;

an opening in said wall dividing said compartments;

a dip tube disposed in said liquid absorbent accumulator compartment sealingly connected to said opening in said wall for conducting condensed hydrocarbons from said three-phase separator compartment to the bottom of said liquid absorbent accumulator compartment; and an outlet connection in the bottom of said liquid absorbent accumulator compartment for removing rich liquid absorbent and said condensed hydrocarbons therefrom.

18. The apparatus of claim 17 wherein said single vessel is a horizontal cylindrical vessel.

19. The apparatus of claim 18 wherein said absorber is removably connected to the top of said liquid absorbent accumulator.

20. The apparatus of claim 17 wherein a hydrocarbon condenser having a condensed hydrocarbon accumulator portion is substituted for said absorber having a hydrocarbon rich liquid absorbent accumulator portion.

* * * * *